US012584049B2

(12) United States Patent
Snyder et al.

(10) Patent No.: US 12,584,049 B2
(45) Date of Patent: Mar. 24, 2026

(54) ADHESIVE COMPOSITIONS FOR ANCHORING FASTENERS

(71) Applicant: H.B. Fuller Company, St. Paul, MN (US)

(72) Inventors: Desiree Nicole Snyder, Metamora, MI (US); David Carlson, Rochester Hills, MI (US); Alexis Leigh Ferrier, Oak Park, MI (US)

(73) Assignee: H.B. Fuller Company, St. Paul, MN (US)

( * ) Notice: Subject to any disclaimer, the term of this patent is extended or adjusted under 35 U.S.C. 154(b) by 781 days.

(21) Appl. No.: 17/776,294

(22) PCT Filed: Apr. 28, 2020

(86) PCT No.: PCT/US2020/030171

§ 371 (c)(1),
(2) Date: May 12, 2022

(87) PCT Pub. No.: WO2021/096556

PCT Pub. Date: May 20, 2021

(65) Prior Publication Data

US 2022/0363963 A1      Nov. 17, 2022

Related U.S. Application Data

(60) Provisional application No. 62/935,529, filed on Nov. 14, 2019.

(51) Int. Cl.
| | |
|---|---|
| *C09J 163/04* | (2006.01) |
| *C09J 5/08* | (2006.01) |
| *C09J 9/00* | (2006.01) |

(52) U.S. Cl.
CPC .............. *C09J 163/04* (2013.01); *C09J 5/08* (2013.01); *C09J 9/005* (2013.01); *C09J 2203/102* (2013.01); *C09J 2301/412* (2020.08); *C09J 2301/416* (2020.08); *C09J 2463/00* (2013.01)

(58) Field of Classification Search
None
See application file for complete search history.

(56) References Cited

U.S. PATENT DOCUMENTS

| | | | | |
|---|---|---|---|---|
| 5,426,130 | A | 6/1995 | Thurber et al. | |
| 6,077,886 | A * | 6/2000 | Hayes | C08L 63/00 |
| | | | | 106/287.3 |
| 7,503,979 | B2 * | 3/2009 | Haller | B05C 9/02 |
| | | | | 118/667 |
| 9,404,015 | B2 * | 8/2016 | Hable | C09D 7/65 |
| 2014/0199135 | A1 | 7/2014 | Hable et al. | |
| 2015/0232692 | A1 * | 8/2015 | Snyder | B01J 13/14 |
| | | | | 521/86 |
| 2016/0068726 | A1 * | 3/2016 | Snyder | C08L 79/02 |
| | | | | 523/400 |
| 2021/0214574 | A1 | 7/2021 | Carlson et al. | |

FOREIGN PATENT DOCUMENTS

| | | |
|---|---|---|
| EP | 3191538 A1 | 7/2017 |

OTHER PUBLICATIONS

International Search Report for PCT/US2020/030171 dated Jul. 20, 2020, 3 pages.

* cited by examiner

*Primary Examiner* — Michael N Orlando
*Assistant Examiner* — Abhishek A Patwardhan

(57) ABSTRACT

An ultraviolet-curable (UV-curable) adhesive composition is disclosed. The adhesive composition comprises: A) an epoxy curing agent component; B) a microencapsulated epoxy resin component; C) an expansion agent component; D) a binder component; and E) a photoinitiator component. The adhesive composition is useful for forming an adhesive. In various embodiments, the adhesive composition is in the form of a stick. The adhesive composition is useful for securing a fastener (e.g. in a borehole).

19 Claims, No Drawings

ADHESIVE COMPOSITIONS FOR ANCHORING FASTENERS

CROSS-REFERENCE TO RELATED APPLICATIONS

This application is the U.S. National Stage of International Application No. PCT/US2020/030171, filed on 28 Apr. 2020, which claims priority to and all benefits of U.S. Provisional Application No. 62/935,529, filed on 14 Nov. 2019, the disclosure of which is incorporated herein by reference in its entirety.

FIELD OF THE INVENTION

The present invention generally relates to radiation-curable adhesive compositions, and more specifically, to ultraviolet-curable adhesive compositions. The adhesive compositions can be used to form adhesives. The adhesives can be in the form of sticks (or rods) that can be used to secure fasteners in boreholes, such as anchors in concrete. Related methods and uses are also provided herein.

DESCRIPTION OF THE RELATED ART

Fasteners provide a means for mechanically joining parts together. Some fasteners are specifically adapted for particular end-uses and/or substrates. For example, TAPCON® provides screw anchors for concrete applications.

While conventional screw anchors may provide adequate installation torque and holding power for certain applications, some applications require lower installation torque and/or higher holding power and/or other desired properties by an end user. Conventional methods for increasing holding power of a fastener include use of two-component ("2K") adhesives with each of the components physically separated in a package having two chambers. The package is placed in a borehole and then a fastener is installed in the borehole. During installation of the fastener, the package ruptures thereby allowing the two components to mix, react, and cure. Although an adhesive is formed, the package is limited in size and shape, a tear between the chambers may result in premature curing, the packaging creates a zone or dead space without adhesive capability, and complete mixing of the components is limited. In addition, the adhesive may not completely fill the space between the borehole and the fastener.

Accordingly, there remains an opportunity to provide improved adhesives, fasteners, and means for fastening, especially for anchoring of fasteners (e.g. bolts or screws) in aggregate (e.g. concrete), stone, etc.

BRIEF SUMMARY OF THE INVENTION

A radiation-curable adhesive composition is disclosed. In various embodiments, the radiation-curable adhesive composition is an ultraviolet-curable adhesive composition. In certain embodiments, the ultraviolet-curable adhesive composition comprises: A) an epoxy curing agent component; B) a microencapsulated epoxy resin component; C) an expansion agent component; D) a binder component; and E) a photoinitiator component. The microencapsulated epoxy resin component B) and the expansion agent component C) are generally present in a weight ratio of from about 20:1 to about 1:20.

The ultraviolet-curable adhesive composition can be used for forming an adhesive composition. The adhesive composition can be used to secure a fastener (e.g. in a borehole).

DETAILED DESCRIPTION OF THE INVENTION

The radiation-curable adhesive composition of this disclosure can be an ultraviolet-curable adhesive composition or an electron beam-curable adhesive composition. As understood in the art, the first composition type generally cures (or cross-links) via a high-intensity ultraviolet (UV) light source, while the second composition type generally cures via an electron beam (EB) energy source. In many embodiments, the radiation-curable adhesive composition is an ultraviolet-curable adhesive composition.

The ultraviolet-curable (or "UV-curable") adhesive composition may also be referred to herein simply as the "composition." The composition generally cures in two steps (or instances in time) such that it may be referred to as a dual-cure composition.

In a first curing step, the composition partially cures to form the adhesive composition (or adhesive intermediate). Specifically, the binder component cures via the photoinitiator component and UV light in the presence of the other components (which are generally inert during this curing step) to form the adhesive composition. In general, the adhesive composition is solid (or predominantly solid) after this curing step.

As such, the other components present in the adhesive composition are generally carried in a polymeric matrix formed by the binder component. The other components are then free to interact and/or react in a second curing step, typically during end use of the adhesive composition. For example, the adhesive composition can be sheared and/or mixed by a fastener, thus allowing the remaining components to interact and/or react to form a final adhesive/cured product.

As used herein, the term "composition" is generally used prior to initiating cure of the UV-curable composition. The term "adhesive" is generally used any time after cure of the adhesive composition is initiated, and need not refer to the adhesive in a final cure state. Final cure of the adhesive is generally initiated, for example, during or after a fastener is put in place (or installed) for an end application.

Epoxy Curing Agent

Various types of epoxy curing agents ("curing agents") can be utilized in the composition. The curing agent is different from the binder. In various embodiments, the curing agent comprises an amine and/or an amine adduct.

Suitable curing agents can be selected from the group consisting of aliphatic, cycloaliphatic aliphatic modified amines, and mixtures thereof. Non-limiting examples include polyetheramines, aliphatic amines, modified and unmodified cycloaliphatic amines, polyamides, and the like.

In certain embodiments, the curing agent comprises at least one of a cycloaliphatic amine, a tertiary amine, a tertiary aromatic amine, an aromatic amine, a phenalkamine, or a primary amine. Suitable compounds may have additional amine groups different from tertiary amine groups, such as primary amine groups and/or secondary amine groups. Moreover, suitable compounds can be aromatic, aliphatic, or a combination of both. In many embodiments, the curing agent is a tertiary aromatic amine. In specific embodiments, the tertiary aromatic amine is 2,4,6-tris(dimethylaminomethyl)phenol. In other specific embodiments, the curing agent is dimethylamino(methyl)phenol. In these embodiments, the curing agent can comprise ortho-isomers of dimethylamino(methyl)phenol, para-isomers of dimethylamino(methyl)phenol, or combinations thereof. In other embodiments, the curing agent comprises a condensation product of a dimer acid and diethylene glycol diaminopropyl ether.

In some embodiments, the curing agent comprises a tertiary amine, a polyamide, a hindered secondary amine, a mercaptan-based curing agent, a latent epoxy curing agent initiated by thermal input, or combinations thereof.

In yet other specific embodiments, the curing agent is 1,3-Bis[3-(dimethylamino)propyl]urea. In yet other specific embodiments, the curing agent comprises a diamine, such as 4,4-diaminodicyclohexylmethane (which may be referred to in the art as "PACM"). In yet other specific embodiments, the curing agent comprises dimethylbenzylamine (or "BDMA") and/or 2,4,6-tri(dimethylaminomethyl) phenol. In yet other specific embodiments, the curing agent comprises tetraethylenepentamine (or "TEPA").

It is to be appreciated that the curing agent is different from the binder, despite the possibility of both the binder and curing agent having amine functional groups. Specific examples of suitable curing agents include those commercially available from Prox-Chem America, Inc. of Londonderry, NH, under the trademark ACTIRON®, such as ACTIRON® NX-3. Other specific examples of suitable curing agents include those commercially available from BASF Corporation under the trademark VERSAMINE®, such as VERSAMINE® EH 30 and VERSAMINE® EH 50. Yet other specific examples of suitable curing agents include those commercially available from Air Products under the trademark ANCAMINE®, including ANCAMINE® K54 and ANCAMINE® 1110. Yet other specific examples of suitable curing agents include those commercially available from Elé Corporation under the trademark PEL-CAT, including PEL-CAT 9667. Yet other specific examples of suitable curing agents include those commercially available from Cardolite Corporation under the trademark CARDO-LITE®, including CARDOLITE® NX-5454. Still another specific example of a suitable curing agent includes those commercially available from Evonik Corporation under the trademark ANCAMIDE, including ANCAMIDE 910. Mixtures of curing agents may be used in the composition.

The curing agent can be present in the composition in various amounts. In certain embodiments, the curing agent is present in an amount of from about 1 to about 20, about 2 to about 18, about 5 to about 15, about 8 to about 12, or about 10, part(s) by weight, each based on 100 parts by weight of the composition.

Microencapsulated Epoxy Resin

Various types of epoxy resins can be utilized in the composition. Typically, the epoxy resin is multifunctional, i.e., has two or more epoxide functional groups. In various embodiments, the epoxy resin has an average functionality of from about 2 to about 3, about 2.2 to about 2.8, about 2.4 to about 2.6, or about 2.5. In certain embodiments, the epoxy resin comprises at least one of a bisphenol A epoxy resin, a bisphenol F epoxy resin, a novolac epoxy resin, an aliphatic epoxy resin, or a glycidyl amine epoxy resin. In many embodiments, the epoxy resin comprises at least one of a bisphenol F epoxy resin or a novolac epoxy resin. In specific embodiments, the epoxy resin comprises a bisphenol F epoxy resin. In other specific embodiments, the epoxy resin comprises a novolac epoxy resin.

The epoxy resin can be of various molecular weights. In various embodiments, the epoxy resin has a weight per epoxide of from about 150 to about 200, about 160 to about 195, or about 165 to about 195, g/eq. In certain embodiments, the epoxy resin has a weight per epoxide of from about 165 to about 185, or about 170 to about 180, alternatively of from about 175 to about 200, or about 180 to about 195, g/eq.

Specific examples of suitable bisphenol F epoxy resins include those commercially available from Huntsman Advanced Materials of East Lansing, Mich., under the trademark ARALDITE®, such as ARALDITE® GY-282. Specific examples of suitable novolac epoxy resins include those commercially available from Momentive Specialty Chemicals of Waterford, N.Y., under the trademark EPON™, such as EPON™ 160 and EPON™ 815C. Mixtures of epoxy resins may be used in the composition.

The epoxy resin is encapsulated, more typically microencapsulated. Said another way, the epoxy resin is generally contained in capsules having an average diameter in the micron scale. Encapsulation of the epoxy resin is useful to maintain separation of the epoxy resin from the curing agent. The microencapsulation can be such that, upon installation of a fastener adjacent the composition, the installation action, for example threading or driving the fastener into place, exerts sufficient force and/or pressure to rupture the microcapsules, resulting in the components inside the microcapsules being expelled therefrom, and no longer isolated in the microcapsules. The subsequent exposure of the previously isolated components starts activation of the final cure process.

The epoxy resin can be encapsulated by various methods in the art and this disclosure is not limited to a particular one. In certain embodiments, the epoxy resin is encapsulated via in-situ polymerization and/or via deposition of a shell material to the surface of the epoxy resin within an aqueous emulsion. Reaction conditions for encapsulation are understood by those of ordinary skill in the art or can be determined via routine experimentation.

The shell material may be of various chemistries. In certain embodiments, the shell material comprises formaldehyde-urea, formaldehyde-melamine, formaldehyde-resorcinol, or combinations thereof. In many embodiments, the shell material comprises a melamine and/or resorcinol modified formaldehyde-urea resin. It is thought that melamine and resorcinol modifications generally increase cross-link density of the shell material and provide increased stability in aqueous applications.

The amount of epoxy resin within the microcapsules can vary. In certain embodiments, the epoxy resin is present in an amount of from about 10 to about 90, about 20 to about 85, about 30 to about 80, about 45 to about 75, or about 50 to about 70, parts by weight, each based on 100 parts by weight of the encapsulated epoxy resin. In these embodiments, the remaining parts by weight of the encapsulated epoxy resin, is predominantly or entirely shell material.

The encapsulated epoxy resin can be present in the composition in various amounts. In certain embodiments, the encapsulated epoxy resin is present in an amount of from about 25 to about 55, about 30 to about 50, about 35 to about 45, about 40 to about 45, or about 42, parts by weight, each based on 100 parts by weight of the composition.

Expansion Agent

Various types of expansion agents can be utilized in the composition. Expansion can assist in locking the fastener in place during and after final cure of the adhesive composition, e.g. by increasing the surface for which the adhesive can adhere. Expansion includes, but is not limited to, foaming. Expansion can occur in one, two, or three directions or dimensions.

In various embodiments, the expansion agent comprises a blowing agent which causes the adhesive composition to expand, e.g. upon installation of a fastener. In turn, this seals or otherwise fills the gaps between the fastener and surrounding aperture to provide a second functionality, such as sealing and/or expanding functionality. In general, the expanded network introduced between the fastener and aperture wall maximizes contact surface area, creates internal pressure to "lock in and/or anchor" the fastener, and provides a dampening barrier to dissipate the transfer of shock force from the fastener (e.g. an anchor or a screw) to the aperture interface.

Specific examples of expansion agents suitable for the composition include those that release gases (or a liquid such as water) upon the application of heat. In other words, the composition can include an additive that itself acts as or provides a physical blowing agent. Specific examples thereof include azocarbonamides and its activated forms, N,N'-dinitrosopentamethyenetetramine, sulfonyl hydrazides, p-toluenesulfonyl semicarbazide, and 5-phenyltetrazole. Alternatively, the expansion agent may comprise an encapsulated hydrocarbon, e.g. encapsulated butane or propone. In these embodiments, the encapsulated hydrocarbon includes a shell wall which softens or melts at elevated temperatures, resulting in the release of the hydrocarbon in a gaseous form. Alternatively still, the expansion agent may comprise metal hydroxide or other hydrated material, such as magnesium hydroxide, aluminum trihydroxide, alumina trihydrate, sodium sulfate decahydrate, magnesium sulfate heptahydrate, magnesium chloride hexahydrate, etc. Physical blowing agents are useful for expanding the composition during cure such that the resulting adhesive better locks the fastener into place by expanding onto/into opposing surfaces.

In various embodiments, the expansion agent can be an alkyl hydrogen silicone fluid. For example, the expansion agent can comprise a microencapsulated methyl hydrogen silicone fluid. Such fluid can react to release hydrogen ($H_2$) gas when exposed to select acids, bases, or oxidizing agents. In certain embodiments, activation of the methyl hydrogen silicone fluid can occur upon contact with a primary or secondary amine present in the composition. Where an amine is present in the composition, it is contemplated that the amine may function as both an activator for the methyl hydrogen silicone fluid and as a curative for the reactive compound, such as an epoxy or an acrylic material.

Optionally, the methyl hydrogen silicone fluid may be dispersed in the composition and the activating agent (acid, base, or oxidizing agent) is microencapsulated. In various embodiments, the methyl hydrogen silicone fluid and the activating agent can be separated spatially by deposition onto the substrate in separate layers or on different areas of the associated fastener such that the materials are physically mixed and activated by installation of the fastener in the aperture or associated end use location.

In various embodiments, the expansion agent is encapsulated, more typically microencapsulated. Said another way, the expansion agent is generally contained in capsules having an average diameter in the micron scale. Encapsulation of the expansion agent is useful to prevent premature expansion of the composition. The microencapsulation can be such that, upon installation of a fastener with the composition disclosed herein, the installation action, for example threading or driving the fastener into place, exerts sufficient force and/or pressure to rupture the microcapsules, resulting in the components inside the microcapsules being expelled therefrom, and no longer isolated in the microcapsules. The subsequent exposure of the previously isolated components starts the expansion process, generally also during the cure process. In such instances, expansion (and curing) results in both locking and sealing functionality.

In other embodiments, the expansion agent comprises an acid and metal, acid and sodium bicarbonate (and/or other gas evolving acid-base reactions), and/or an encapsulated isocyanate. Mixtures of different expansion agents can also be used.

The expansion agent can be present in the composition in various amounts. In various embodiments, the expansion agent is present in an amount sufficient to generate gas in a manner and rate sufficient to be entrained in the polymeric material during cross-linking reaction. Entrainment of a gas is not required.

In certain embodiments, the expansion agent is present in an amount of from about 1 to about 30, about 2 to about 25, about 5 to about 20, about 10 to about 15, or about 13, part(s) by weight, each based on 100 parts by weight of the composition. Too little of the expansion agent may not provide sufficient adhesion properties for a desired application, whereas too much of the expansion agent may cause weakening of the resulting adhesive, e.g. by making it friable.

In various embodiments, the microencapsulated epoxy resin and the expansion agent are present in the composition in a weight ratio of from about 20:1 to about 1:20, about 15:1 to about 1:1, about 5:1 to about 3:1, or about 4:1 to about 2:1. Without being bound to any particular theory, it is believed that the aforementioned ratios impart the composition with excellent expansion and cure properties.

Optional Binder (or Carrier)

Various types of binders can be utilized in the composition. In various embodiments, the binder is a resin that can be present at a molecular weight between oligomeric to medium molecular weight thermoplastic resin. In various embodiments, the weight average molecular weight of the binder can be about 2,000 to about 2,000,000. Suitable polymeric binders include, but are not limited to, polyvinyl acetals such as polyvinyl butyral (PVB), acrylic copolymers and terpolymers, thermoplastic polyurethanes, thermoplastic elastomer, polyvinyl alcohol (PVOH), acrylic or vinyl polymer or copolymer dispersions.

Non-limiting examples of suitable acrylic copolymers and/or terpolymers include, but are not limited to, any mono, di, tri, or multifunctional acrylate or methacrylate, various substituted and unsubstituted methacrylic copolymeric and/or terpolymeric resins. Non-limiting examples of substituent groups can include C-1 to C-18 branched or unbranched alkyl groups. Optional polymeric binders can include monomers such as methyl acrylate and/or methyl methacrylate, where a methyl substituent can be a C-1 alkyl group. The acrylic resin materials can be monosubstituted or disubstituted or polysubstituted. The polymeric binder material can contain reactive functional groups that provide a dual functionality by undergoing at least some three-dimensional cross-linking. Non-limiting examples of suitable functional groups include amine groups, hydroxyl groups, and carboxyl groups. The reactive functionality, if present, is capable of cross-linking into a three-dimensional network of bonds or can function as a curing agent.

Polymeric binders in the form of acrylic copolymers and/or terpolymers can be produced by any suitable means. It is contemplated that the material used can be the result of in-situ polymerization of copolymers and various monomeric units including, but not limited to, short chain acrylates and methacrylates including, but not limited to, methyl, polymethyl, ethyl, polyethyl butyl and/or polybutyl acrylates and/or methacrylates. Suitable (meth)acrylate resins include those having a weight average molecular weight between about 50,000 and 250,000 and an intrinsic viscosity of from about 0.1 to about 0.4.

Non-limiting examples of suitable methacrylate resin copolymers include various resins commercially available from Dianal America of Pasadena, Tex., U.S.A. under the trade name DIANAL. A non-limiting example of such is DIANAL BR-115 resin which is thought to be a poly-isobutyl methacrylate resin. Other examples of suitable methacrylate resins include polybutyl methacrylates such as those commercially available from Lucite International, of Hampshire, United Kingdom, under the trade name ELVACITE, such as ELVACITE 2014 and ELVACITE 2550. Also contemplated is the use of various methacrylate/butyl acrylate copolymers copolymerized with acrylic and/or methacrylic acid.

Polymeric binders may also be selected from polyethylene oxides or polyethylene imine resins, epoxy adducts, hydrocarbon resins, or synthetic hydrocarbon waxes. Natural or synthetic rubbers or thermoplastic elastomers may also be used.

Suitable polyvinyl acetals for the polymeric binders are those formed by the acid catalyzed acetalization of poly (vinyl acetate). In certain embodiments, polyvinyl butyral can be used. It is contemplated that the polyvinyl butyrals having a hydroxyl content expressed as residual poly(vinyl alcohol) content of from about 10% to about 15% as determined by IR analysis by test method WB-03-01-55; and an average molecular weight between about 30,000 and about 80,000 can be used. Non-limiting examples of suitable materials include BUTVAR resins, such as BUTVAR B-79 resin.

The binder can also include various engineered plastics such as polyimide resins, polyetherimide resins, polyamideimide resins, and the like. Suitable materials will generally have a number average molecular weight between about 500,000 and 800,000.

In various embodiments, the binder comprises an acrylic resin, and in further embodiments an acrylic bead resin. In these embodiments, the acrylic resin may be prepared from a reaction mixture including, but not limited to, (meth) acrylate monomers such as methyl methacrylate (MMA), ethyl acrylate (EA), butyl acrylate (BA), butyl methacrylate (BMA), n-butyl methacrylate (n-BMA), isobutylmethacrylate (IBMA), polyethylmethacrylate (PEMA), or combinations thereof. Exemplary acrylic resins include those commercially available from Rohm and Haas, Co., of Philadelphia, PA under the trade designation PARALOID, such as PARALOID B-48N; and from Ineos Acrylics, of Cordova, TN under the trade designation ELVACITE resins. Other suitable acrylic resins include those from S.C. Johnson, of Racine, Wis. under the trade designation JONCRYL acrylics.

It is to be appreciated that the reaction mixture for preparing the acrylic resin may include other olefinically unsaturated monomers including monomers which may contain, apart from an olefinic double bond, further functional groups or may contain, apart from an olefinic double bond, no further functional groups. Non-limiting examples of other suitable olefinically unsaturated monomers include other olefinically unsaturated monomers, such as alkyl (meth)acrylates, cycloaliphatic (meth)acrylates and aromatic (meth)acrylates. Typical alkyl (meth)acrylates have from 1 to 18 carbons in the alkyl group such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, pentyl (meth)acrylate, hexyl(meth) acrylate, 2-ethyl hexyl (meth)acrylate, nonyl (meth)acrylate, decyl (meth)acrylate, lauryl (meth) acrylate, and the like. Cycloaliphatic (meth)acrylates can be used such as cyclohexylacrylate, trimethylcyclohexyl (meth)acrylate, t-butyl cyclohexyl (meth)acrylate, and the like. Aromatic (meth)acrylates such as benzyl (meth)acrylate, phenyl (meth)acrylate, and phenoxy ethyl (meth)acrylic can also be used.

Non-limiting examples of suitable hydroxy functional olefinically unsaturated monomers include hydroxyalkyl esters of alpha, beta-olefinically unsaturated monocarboxylic acids having primary or secondary hydroxyl groups. Further non-limiting examples include the hydroxyalkyl esters of acrylic acid, methacrylic acid, crotonic acid and/or itaconic acid. The hydroxyalkyl radicals may contain, for example, 1 to 10 carbon atoms or optionally 2 to 6 carbon atoms. Non-limiting examples of suitable hydroxyalkyl esters of alpha, beta-olefinically unsaturated monocarboxylic acids having primary hydroxyl groups are 2-hydroxyethyl(meth)acrylate, 3-hydroxypropyl(meth)acrylate, 4-hydroxybutyl(meth)acrylate, 5-hydroxyamyl(meth)acrylate, 6-hydroxyhexyl(meth)acrylate, or combinations thereof. Non-limiting examples of suitable hydroxyalkyl esters having secondary hydroxyl groups include 2-hydroxypropyl (meth)acrylate, 2-hydroxybutyl(meth)acrylate, 3-hydroxybutyl(meth)acrylate, or combinations thereof. Further hydroxy functional olefmically unsaturated monomers which may be used are reaction products of alpha, beta-unsaturated monocarboxylic acids with glycidyl esters of saturated monocarboxylic acids branched in the alpha position, e.g., with glycidyl esters of saturated alpha-alkylalkane monocarboxylic acids or alpha, alpha'-dialkylalkane monocarboxylic acids. In certain embodiments, these are the reaction products of (meth)acrylic acid with glycidyl esters of saturated alpha, alpha'-dialkylalkane monocarboxylic acids having from 7 to 13 carbon atoms in the molecule or optionally from 9 to 11 carbon atoms in the molecule. Other hydroxy-functional unsaturated monomers are polyethylene oxide and/or polypropylene oxide modified (meth)acrylates. Other polymerizable monomers can also be used for preparing the acrylic resin, such as styrene, a-methyl styrene, vinyl acetate, vinyl butyrate, vinyl pyrrolidone, and the like.

In certain embodiments, the acrylic resin includes a polymer of n-butyl methacrylate. The acrylic resin may be formed from a reaction mixture including n-butyl methacrylate. In various embodiments, the acrylic resin includes a copolymer of methyl methacrylate and n-butyl methacrylate. The acrylic resin may be formed from a reaction mixture including methyl methacrylate and n-butyl methacrylate.

In certain embodiments, the acrylic resin includes a polymer of methyl methacrylate. The acrylic resin may be formed from a reaction mixture including methyl methacrylate. In various embodiments, the acrylic resin includes a copolymer of methyl methacrylate and butyl acrylate. The acrylic resin may be formed from a reaction mixture including methyl methacrylate and butyl acrylate.

In various embodiments, the binder can comprise one or more acrylic monomers and/or oligomers, such as a mono, di, tri, or multifunctional acrylates or methacrylates. Examples include various (meth)acrylate functional oligomers, (meth)acrylate functional monomers, and/or blends of the same, e.g. in a microencapsulated state. Specific examples of components include those commercially available from Dymax Corporation under the trade name BOMAR, such as BOMAR BR-7432GB, which is difunctional oligomer, specifically an aliphatic polyester urethane diacrylate; as well as from Sartomer Americas such as SR-348, which is a low volatility monomer, specifically an alkoxylated (ethoxylated) bisphenol A dimethacrylate, and SR-610, which is a difunctional monomer, specifically a polyethylene glycol (600) diacrylate.

In certain embodiments, the binder comprises a methacrylate-containing olefinically unsaturated monomer, an acrylate-containing olefinically unsaturated monomer, or a combination thereof. The methacrylate-containing olefinically unsaturated monomer may include, but is not limited to, any olefinically unsaturated monomer including an methacrylate group described above. The acrylate-containing olefinically unsaturated monomer may include, but is not limited to, any olefmically unsaturated monomer including an acrylate group described above. In some embodiments, the binder includes the methacrylate-containing olefinically unsaturated monomer and the acrylate-containing olefmically unsaturated monomer. A specific example of the methacrylate-containing olefinically unsaturated monomer is commercially available from Sartomer Americas such as SR-348 as described above. A specific example of the acrylate-containing olefinically unsaturated monomer is commercially available from Sartomer Americas such as SR-610 as described above.

The methacrylate-containing olefinically unsaturated monomer and the acrylate-containing olefinically unsaturated monomer may be present in a weight ratio of from about 10:1 to about 1:10, about 5:1 to about 1:5, about 2:1 to about 1:2, or about 1.5:1 to about 1:1.5. Other ratios are also possible.

The binder can be present in the composition in various amounts. In certain embodiments, the binder is present in an amount of from about 20 to about 50, about 25 to about 45, about 30 to about 40, about 30 to about 35, or about 33, parts by weight, each based on 100 parts by weight of the composition. In certain embodiments, the composition is substantially or completely free of the binder.

Photoinitiator

Various types of photoinitiators can be utilized in the composition. Initiators useful in preparing the composition are initiators that, on exposure to heat or light, generate free-radicals which initiate (co)polymerization of the monomer and/or oligomer mixture of the binder component. In various embodiments, the photoinitiator is suitable for use with a lamp emitting 395 nm LED light.

Free-radical generating photoinitiators are understood in the art and include initiators such as IRGACURE 651, available from BASF, of Tarrytown, N.Y., which is 2,2-dimethoxy-2-phenylacetophenone. Also useful is DAROCUR 1173, available from BASF, Mount Olive, N.J., which is 2-hydroxy-2-methyl-1-phenyl-propan-1-one or DAROCUR 4265 which is a blend of 50% DAROCUR 1173 and 50% 2,4,6-trimethylbenzoyl-diphenyl-phosphine oxide (TPO). Another useful photoinitiator is Omnirad 380, available from IGM Resins USA Inc., of Charlotte, NC and includes phenylbis(2,4,6-trimethylbenzoyl)phosphine oxide.

Further useful photoinitiators are those available under the trade designations IRGACURE and DAROCUR from BASF Corp., of Tarrytown, N.Y. and include 2,2-dimethoxy-1,2-diphenylethan-1-one (IRGACURE 651), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethyl-amino-1-(4-morpholinophenyl)butanone (IRGACURE 369), and 2-methyl-1-[4-(methylthio)phenyl]-2-morpholinopropan-1-one (IRGACURE 907).

Photoinitiators can also include benzoin, benzoin alkyl ethers, ketones, phenones, and the like. For example, the composition may comprise ethyl-2,4,6-trimethylbenzoylphenylphosphinate available as LUCIRIN TPO-L from BASF Corp., 1-hydroxycyclohexyl phenyl ketone available as IRGACURE 184 from BASF, or 2,4,6-trimethylbenzoyldiphenylphosphine oxide (TPO), available as LUCIRIN TPO from BASF.

Thermally activated initiators may also be used by themselves or in combination with these photoinitiators. Examples of thermal initiators include organic peroxides, such as benzoylperoxide, and azo compounds, such azo-bis-isobutyronitrile. These thermal initiators would be used in a similar concentration range as the photoinitiators.

The photoinitiator can be present in the composition in various amounts. In certain embodiments, the photoinitiator is present in an amount of from about 0.1 to about 10, about 0.5 to about 7, about 0.5 to about 5, about 1 to about 5, or about 1 to about 2, part(s) by weight, each based on 100 parts by weight of the composition.

Optional Rheology Modifier

Various types of rheology modifiers can be utilized in the composition. The rheology modifier may also be referred to as a viscosity modifier herein. The composition may comprise an effective amount of rheology modifier that may provide to the composition thixotropic properties. It is believed that the presence of the rheology modifier alters the rheology of the composition to have desirable thixotropic properties to promote flowability during dispensing while maintaining its shape after dispensing. In various embodiments, the rheology modifier comprises fumed silica. An example of a suitable rheology modifier includes those commercially available from Cabot Corporation under the trademark Cab-O-Sil, including Cab-O-Sil TS720.

The rheology modifier can be present in various amounts. In certain embodiments, the rheology modifier is present in an amount from about 0.1 to about 20, about 0.1 to about 10, or about 0.5 to about 2 part(s) by weight, each based on 100 parts by weight of the composition. In certain embodiments, the composition is substantially or completely free of the rheology modifier.

Optional Additive(s)

The composition may further include a variety of additives understood in the art, including, but not limited to, a plasticizer component, a surfactant component, an anti-settling component, a colorant component, a filler component, a wax, a filler, an impact modifier, a solvent, or combinations thereof. Other components that may be present in the composition include minor amounts of antioxidants, inhibitors, defoamers, dispersing aids, heat stabilizers, UV stabilizers, and the like. In various embodiments, one or more of such compounds are individually present in the composition in an amount less than about 5 weight %. Specific additives and amounts thereof that may be suitable for the composition of this disclosure are described in international application number PCT/US2019/032487, which is incorporated herein by reference in its entirety.

Suitable additives are commercially available from a large number of suppliers. Additives are useful for modifying at least one property (e.g. a physical property) thereof or of the adhesive formed by curing the composition.

Specific Embodiments of the Ultraviolet-Curable Adhesive Composition

In certain embodiments, component A) comprises an amine. In these or other embodiments, component B) comprises a novolac epoxy resin, a bisphenol F epoxy resin, or a combination thereof. In these or yet other embodiments, component C) comprises a microencapsulated expansion agent. In these or yet other embodiments, component D) comprises a methacrylate-containing monomer, an acrylate-containing monomer, an acrylic resin, or combinations thereof. In these or yet other embodiments, component E) comprises 2-hydroxy-2-methyl-1-phenyl-propan-1-one, 2,4,6-trimethylbenzoyl-diphenyl-phosphine oxide, or a combination thereof.

In certain embodiments, component A) is present in an amount of from about 1 to about 20, about 5 to about 20, about 5 to about 15, or about 10, parts by weight based on 100 parts by weight of the UV-curable adhesive composition. In these or other embodiments, component B) is present in an amount of from about 25 to about 55, about 30 to about 50, about 35 to about 45, or about 42, parts by weight based on 100 parts by weight of the UV-curable adhesive composition. In these or other embodiments, component C) is present in an amount of from about 1 to about 30, about 1 to about 25, about 5 to about 25, about 10 to about 20, or about 13, part(s) by weight based on 100 parts by weight of the UV-curable adhesive composition. In these or other embodiments, component D) is present in an amount of from about 20 to about 50, about 25 to about 45, about 25 to about 40, about 30 to about 40, or about 33, part(s) by weight based on 100 parts by weight of the UV-curable adhesive composition. In these or other embodiments, component E) is present in an amount of from about 0.1 to about 10, about 0.1 to about 5, about 0.1 to about 3, about 1 to about 3, about 1 to about 2, or about 1.7, part(s) by weight based on 100 parts by weight of the UV-curable adhesive composition.

In other embodiments, component A) comprises an amine. In these or other embodiments, component B) comprises a novolac epoxy resin, a bisphenol F epoxy resin, or a combination thereof. In these or yet other embodiments, component C) comprises a microencapsulated expansion agent. In these or yet other embodiments, component D) comprises a methacrylate-containing monomer, an acrylate-containing monomer, an acrylic resin, or combinations thereof. In these or yet other embodiments, component E) comprises 2-hydroxy-2-methyl-1-phenyl-propan-1-one, 2,4,6-trimethylbenzoyl-diphenyl-phosphine oxide, or a combination thereof. In these or yet other embodiments, the composition comprises fumed silica as the rheology modifier.

In certain embodiments, component A) is present in an amount of from about 1 to about 20, about 1 to about 20, about 1 to about 5, or about 1.8, parts by weight based on 100 parts by weight of the UV-curable adhesive composition. In these or other embodiments, component B) is present in an amount of from about 25 to about 55, about 30 to about 50, about 35 to about 45, or about 42, parts by weight based on 100 parts by weight of the UV-curable adhesive composition. In these or other embodiments, component C) is present in an amount of from about 1 to about 30, about 1 to about 25, about 5 to about 25, about 10 to about 20, or about 13, part(s) by weight based on 100 parts by weight of the UV-curable adhesive composition. In these or other embodiments, component D) is present in an amount of from about 20 to about 60, about 25 to about 55, about 30 to about 50, about 35 to about 45, or about 40, part(s) by weight based on 100 parts by weight of the UV-curable adhesive composition. In these or other embodiments, component E) is present in an amount of from about 0.1 to about 10, about 0.1 to about 5, about 0.1 to about 3, about 1 to about 3, about 1 to about 2, or about 1.6, part(s) by weight based on 100 parts by weight of the UV-curable adhesive composition. In these or other embodiments, the rheology modifier is present in an amount of from about 0.1 to about 20, about 0.1 to about 10, about 0.5 to about 2, or about 1, part(s) by weight based on 100 parts by weight of the UV-curable adhesive composition.

In various embodiments, the UV-curable adhesive composition consists essentially of A) an amine, B) a novolac epoxy resin, a bisphenol F epoxy resin, or a combination thereof, C) a microencapsulated expansion agent, D) a methacrylate-containing monomer, an acrylate-containing monomer, an acrylic resin, or combinations thereof, E) 2-hydroxy-2-methyl-1-phenyl-propan-1-one, 2,4,6-trimethylbenzoyl-diphenyl-phosphine oxide, or a combination thereof, and a rheology modifier.

Method of Manufacture of the UV-Curable Composition

The composition can be formed using conventional methods understood in the art. The composition is not limited to a particular order or addition of the components, although liquid components (if any) are generally utilized first followed by dry or powder components.

Low shear should be used to prevent or lessen rupture of encapsulated components. After mixing and formation is complete, the resulting composition can be transferred to a storage vessel or used shortly thereafter, e.g. to form the adhesive composition.

In various embodiments, the UV-curable composition has rheology to provide a bead having a cross-sectional diameter in an amount of from about 0.1 to about 10 millimeters (mm), from about 1 to about 5 mm, or from about 1.75 to about 3.75 mm while still being flowable through a nozzle which will be described in greater detail below. In these and other embodiments, the UV-curable composition should be antisag and should not wet out after being dispensed through the nozzle but before UV curing.

Adhesive Composition

In many embodiments, the adhesive composition is a solid mass (i.e. the adhesive is not flowable). The adhesive composition may be of any shape, size, or configuration. In various embodiments, the adhesive composition is in the form of a stick. The stick may also be referred to as a rod. The adhesive composition may have a cross-section having a circular configuration, a semi-circular configuration, an elliptical configuration, a square configuration, a rectangular configuration, a triangular configuration, or any other geometric shape. In certain embodiments, the adhesive composition has a semi-circle or semi-ellipse cross-section. In these or other embodiments, the cross-section can have a major axis of from about 1 to about 10 millimeters, or about 1 to about 5 millimeters.

In certain embodiments, the cross-section of the adhesive composition has a diameter of no greater than 10 millimeters (mm), no greater than 5 mm, no greater than 4 mm, no greater than 3 mm, or no greater than 2 mm. Alternatively, the cross-section of the adhesive composition may have a diameter of from 0.1 to 10 mm, from 0.5 to 5 mm, from 1 to 4 mm, or from 1 to 3 mm.

The adhesive composition may be of various lengths. In various embodiments, the adhesive composition has a length of no greater than 500 mm, no greater than 400 mm, no greater than 300 mm, no greater than 200 mm, or no greater than 100 mm. Alternatively, the adhesive composition may have a length of from 1 to 500 mm, from 1 to 400 mm, from 10 to 300 mm, from 10 to 200 mm, or from 10 to 100 mm.

In an exemplary embodiment, the adhesive composition has a dimensional configuration of 2.75 mm (height)×2.75 mm (width)×63.5 mm (length). In these and other embodiments, the adhesive composition is a semicircle with one flat side.

Method of Manufacture of the Adhesive Composition

The adhesive composition, formed from the UV-curable adhesive composition, can be formed using conventional methods understood in the art. In certain embodiments, the method of forming the adhesive composition includes providing the UV-curable adhesive composition. The step of providing the UV-curable adhesive composition may include providing the UV-curable adhesive composition to the nozzle. The nozzle may have an orifice having a diameter and/or shape that is complimentarily sized to a desired shape, size, width and/or diameter of the dispensed adhesive composition.

The step of providing the UV-curable adhesive composition may further include expelling or dispensing the UV-curable adhesive composition through the nozzle to a release liner. A low shear, positive displacement pump can be used to move and dispense the composition as needed. The release liner may be, of, or formed from, any substrate understood in the art exhibiting release properties. In various embodiments, the UV-curable adhesive composition is provided to a dispensing unit, such as a Nordson EFD Ultimus I Dispense Unit commercially available from Nordson Corporation of Westlake, OH. The UV-curable adhesive composition may then be dispensed to the release liner by the dispensing unit. The each unit of the UV-curable adhesive composition may be dispensed for a period of time from about 0.1 seconds to about 120 seconds, or from about 0.5 seconds to about 40 seconds. The UV-curable adhesive composition may have a viscosity of from about 10,000 cP to about 1,000,000, from about 100,000 cP to about 500,000 cP, or from about 200,000-250,000 cP. The UV-curable adhesive composition may be exposed to a dispense pressure in an amount of from about 1 psi to about 200 psi, from about 5 psi to about 150 psi, or from about 10 psi to about 70 psi, each under a vacuum of from about 0.3 to about 1.3 inH$_2$O, such as 0.30 inH$_2$O. It is to be appreciated that belt speed, dispense pressure, dispense time may be dependent on one another i.e. the faster the belt speed the higher the pressure needs to be and the less the dispense time to achieve proper bead size.

The method of forming the adhesive composition may further include irradiating the UV-curable adhesive composition to form the adhesive composition. The UV-curable adhesive composition may be irradiated utilizing a source configured to generate ultraviolet light, as described above. The step of irradiating the UV-curable adhesive composition may include locating the source and the UV-curable adhesive composition proximate to each other. The step of irradiating the UV-curable adhesive composition may further include energizing the source to generate UV light to irradiate the UV-curable adhesive composition. In various embodiments, the UV-curable adhesive composition may be cured with common mercury vapor bulbs (e.g. H bulb, D bulb, etc.) as well as an LED array at any wavelength (e.g. 365 nm, 395 nm, 405 nm, and 455 nm). In certain embodiments, a 395 nm LED bulb is utilized. Energy input may be from about 0.001 to about 50 J/cm$^2$, from about 0.05 to about 5 J/cm$^2$, or from about 0.5 to about 2 J/cm$^2$.

The method of forming the adhesive composition may further include partitioning the adhesive composition to form a plurality of portions of the adhesive composition. The adhesive composition may be partitioned to form portions each having the length of the adhesive composition described above. For example, the adhesive composition can be dispensed in a series of beads having the same or different length, or a continuous bead of adhesive composition can be cut into desired lengths after dispensing. The adhesive composition can also be sized to different lengths during end use, e.g. by breaking or snapping the adhesive composition to desired length(s). It is to be appreciated that the adhesive composition may be partitioned before being irradiated and/or the adhesive composition may be portioned after being irradiated.

The adhesive composition (or portions of the adhesive composition) may be disposed in a tube, a wrap, or other container adapted for holding the adhesive composition and allowing a user to apply the adhesive composition to a desired location. The present invention is not limited to a particular container type.

Method of Use

A method for joining a fastener and an element is also provided. The element defines a borehole. The element can comprise various materials. In various embodiments, the element comprises at least one of cement, concrete, mortar, or the like. Thus, the element may be a part of a building or be a building or construction component, e.g. a brick, slab, stone, wall, floor, lignocellulosic materials, metallic materials, composite materials, etc.

The method comprises the step of providing the fastener and providing the adhesive composition, e.g. a stick of adhesive composition. The method further comprises the step of disposing the adhesive composition (or portions of the adhesive composition) into the borehole. In various embodiments, more than one portion of the adhesive composition (e.g., 2, 3, 4, or 5 portions of the adhesive composition) are disposed in the borehole. The portions (or pieces) of the adhesive composition may be disposed along a perimeter of the borehole.

The method further comprises disposing the fastener into the borehole. The adhesive composition can be disposed before, during, and/or after placement of the fastener. In various embodiments, at least a portion of, or all of, the adhesive composition is disposed in the borehole before installing the fastener.

The adhesive composition is disposed at least partially between the fastener and the borehole to form a joint. The adhesive composition expands and cures in the joint to fasten the fastener in the borehole. For example, installation of the fastener into the borehole can break apart the adhesive composition thereby allowing the microcapsules of the adhesive to rupture, thus facilitating expansion and cure of the same. In this way, the adhesive provides a mechanism for self-anchoring of the fastener in the borehole.

The method can further comprise the step of forming the borehole in the element. For example, a drill and bit can be used to drill the element, thus presenting the borehole. The method can further comprise the step of cleaning at least a portion of the borehole, generally prior to the step of disposing the adhesive composition into the borehole. For example, the borehole can be blown and/or vacuumed to remove excess material from the hole, e.g. dust, powder, etc. The fastener can be as described below, e.g. an anchor or a screw.

Fastener

The present invention is not limited to a particular type of fastener. In general, the fastener is a conventional fastener understood in the art. Suitable fasteners include, but are not limited to, anchors, bolts, nuts, screws, studs, stand-offs, plugs/caps, and combinations thereof. With anchors, bolts, screws, studs, and stand-offs, the fastener will generally have an elongated body which includes the threaded surface, and optionally, an adjacent smooth surface (or surfaces). The fastener may be of various types, drive types, head styles (or headless), diameters, and lengths. Combinations of different coated (or uncoated) fasteners may be utilized for a given end application, e.g. bolts and nuts, bolts and studs, bolts and screws, etc., or the fastener may be utilized alone.

In various embodiments, the fastener comprises a threaded surface. The threaded surface may be external (i.e., male) or internal (i.e., female), and can be of various types, configurations, or patterns. As such, the threaded surface is not limited to, for example, a particular major diameter, minor diameter, pitch diameter, helix angle, thread angle, thread count, thread pitch, or number of crests/roots.

The fastener may be formed from conventional materials including, but not limited to, carbon steel, alloy steel, stainless steel ("SS"), plain steel ("PS"), iron, brass, bronze, titanium, aluminum, magnesium alloy, and combinations thereof. In general, the fastener is formed from a metal or metal alloy to provide strength and rigidity.

The fastener may include various types of conventional plating and/or coating materials, including, but not limited to, zinc plating (e.g. galvanization, zinc flakes, etc.), chromium (or chrome) plating, nickel plating, cadmium plating, aluminum plating, magnesium coating, phosphate (e.g. dry phosphate) coating, and combinations thereof. Alternatively, the fastener may be a "virgin" or "bright" fastener (i.e., it may lack plating/coating). However, the fastener typically includes a conventional plating and/or coating material to prevent corrosion and/or aid in installation. Suitable fasteners are commercially available from a large number of suppliers.

INDUSTRIAL APPLICABILITY

The compositions disclosed herein can be used to secure and/or to prevent loosening of fasteners. Various end applications and industries are possible, such as mechanical, industrial, and construction applications.

The compositions herein can provide superior anchoring, bonding, and energy dissipation features, especially in rigid and semi-rigid substrates. For example, the substrate can comprise cement, concrete, mortar, or the like. The substrate can also comprise lignocellulosic materials, such as wood and wood composites, e.g. particle board, fiberboard (e.g. MDF), and the like. The substrate can also comprise polymeric materials. The substrate can also comprise metals, composites, and other materials which may be associated with various industrial and construction industries. The substrate can also be a combination of two or more different materials.

In various embodiments, the compositions provide excellent and/or improved anchoring to rigid or semi-rigid interfaces. Such interfaces can be susceptible to cracking and/or breakdown under one or more forces, e.g. shock force. The fasteners can be used in or for various substrates, such as those formed from metals and alloys thereof, masonry and other cementitious materials, wood and other lignocellulosic materials, ceramics, polymers, composites, and the like. In certain embodiments, the compositions are especially useful for anchoring applications in masonry.

The following examples, illustrating the compositions and methods of this disclosure, are intended to illustrate and not to limit the invention.

EXAMPLES

Provided below are exemplary formulations of the inventive UV-curable adhesive compositions of this disclosure.

The compositions are formed by adding the components to a vessel and mixing. The resulting compositions are mixed thoroughly with a low shear paddle blade so as to not prematurely rupture any microencapsulated components.

TABLE I

| Prophetic UV-Curable Adhesive Compositions | | | |
|---|---|---|---|
| Component (wt. %) | Prophetic Example No. 1 | Prophetic Example No. 2 | Prophetic Example No. 3 |
| Epoxy Curing Agent 1 | 1 to 20 | 1 to 15 | 1 to 10 |
| Epoxy Curing Agent 2 | 1 to 20 | 1 to 15 | 1 to 10 |
| Epoxy Resin | 25 to 55 | 35 to 50 | 35 to 45 |
| Expansion Agent | 1 to 30 | 10 to 20 | 10 to 15 |
| Binder 1 | 10 to 50 | 10 to 20 | 15 to 20 |
| Binder 2 | 10 to 50 | 15 to 30 | 15 to 20 |
| Photoinitiator | 0.1 to 10 | 1 to 3 | 1 to 2 |
| Rheology Modifier | 0.1 to 20 | 0.1 to 10 | 0.5 to 2 |
| TOTAL | 100 | 100 | 100 |

Epoxy Curing Agent 1 is a tertiary amine, which is commercially available from Gabriel Phenoxies Inc.

Epoxy Curing Agent 2 is a condensation product of a dimer acid and diethylene glycol diaminopropyl ether, which is commercially available from Evonik Corporation.

Epoxy Resin is a microencapsulated novolac epoxy resin, which is commercially available from Momentive Specialty Chemicals Inc.

Expansion Agent is a microencapsulated methyl hydrogen silicone fluid, which is commercially available from Genesse Polymers Corporation.

Binder 1 is a 2-mole ethoxylated bisphenol A dimethacrylate, which is commercially available from Sartomer Americas.

Binder 2 is a polyethylene glycol (600) diacrylate, which is commercially available from Sartomer Americas.

Photoinitiator is a blend of 50% 2-hydroxy-2-methyl-1-phenyl-propan-1-one and 50% 2,4,6-trimethylbenzoyl-diphenyl-phosphine oxide, which is commercially available from BASF Corp.

Rheology Modifier is a fumed silica, which is commercially available from Cabot Corporation.

TABLE II

| Inventive UV-Curable Adhesive Compositions | | | | |
|---|---|---|---|---|
| Component (wt. %) | Inventive Example No. 1 | Inventive Example No. 2 | Inventive Example No. 3 | Inventive Example No. 4 |
| Epoxy Curing Agent 1 | 10 | 1.8 | — | 1.8 |
| Epoxy Curing Agent 2 | — | — | 7.9 | 7.9 |
| Epoxy Resin | 42.15 | 42.15 | 42.15 | 42.15 |
| Expansion Agent | 13.15 | 13.15 | 13.15 | 13.15 |
| Binder 1 | 14.58 | 16.55 | 15.55 | 14.65 |
| Binder 2 | 18.46 | 23.75 | 19.65 | 18.75 |
| Photoinitiator | 1.66 | 1.6 | 1.6 | 1.6 |
| Rheology Modifier | — | 1 | — | — |
| TOTAL | 100 | 100 | 100 | 100 |

Epoxy Curing Agent 1 is a tertiary amine, which is commercially available from Gabriel Phenoxies Inc.

Epoxy Curing Agent 2 is a condensation product of a dimer acid and diethylene glycol diaminopropyl ether, which is commercially available from Evonik Corporation.

Epoxy Resin is a microencapsulated novolac epoxy resin, which is commercially available from Momentive Specialty Chemicals Inc.

Expansion Agent is a microencapsulated methyl hydrogen silicone fluid, which is commercially available from Genesse Polymers Corporation.

Binder 1 is a 2-mole ethoxylated bisphenol A dimethacrylate, which is commercially available from Sartomer Americas.

Binder 2 is a polyethylene glycol (600) diacrylate, which is commercially available from Sartomer Americas.

Photoinitiator is a blend of 50% 2-hydroxy-2-methyl-1-phenyl-propan-1-one and 50% 2,4,6-trimethylbenzoyl-di-phenyl-phosphine oxide, which is commercially available from BASF Corp.

Rheology Modifier is a fumed silica, which is commercially available from Cabot Corporation.

To form the adhesive compositions, Inventive Example Nos. 1 to 4 are dispensed as long beads onto release liners. Each of the beads are then irradiated with UV-light to cure the binder.

Physical properties of the adhesive compositions above were evaluated. Specifically, a drill was used to form boreholes in concrete. The holes were cleaned out using compressed air. The adhesive composition was then snapped into a few pieces and transferred to the holes. Next, a masonry anchor (TAPCON® screw) was installed in the hole. The adhesive composition expands and cures to retain the fastener. Provided below are test results, where "Break" is break away torque, and "Prevail" is prevailing off torque, each in in·lbs unless otherwise indicated. Evaluation of the fasteners are performed in accordance with ASTM D5649.

Uncoated fasteners were installed into control boreholes which are free of the adhesive and the inventive boreholes. These results are illustrated in the tables below.

TABLE III

Fasteners installed in boreholes free of the adhesive composition (Control).
TAPCON® Screw - Tapered Head

| Uncoated | Break | Prevail |
|---|---|---|
| 1 | 12 | 6 |
| 2 | 8 | 5 |
| 3 | 12 | 10 |
| Avg. (in · lbs) | 10.7 | 7.0 |

TABLE IV

Fasteners installed in boreholes including the adhesive composition of Example No. 1 (Inventive). The adhesive composition was allowed to cure for 24 hours at ambient temperature.
TAPCON® Screw - Tapered Head

| Anchored | Break | Prevail* |
|---|---|---|
| 1 | 160 | 100 |
| 2 | 150 | 135 |
| 3 | 160 | 160 |
| Avg. (in · lbs) | 156.7 | 131.7 |
| Improvement to Control | 14.6 X | 18.8 X |

*All fasteners snapped/broke during prevailing off measurement

TABLE V

Fasteners installed in boreholes including the adhesive composition of Example No. 2 (Inventive). The adhesive composition was allowed to cure for 72 hours at ambient temperature.
TAPCON® Screw - Tapered Head

| Anchored | Break | Prevail |
|---|---|---|
| 1 | 105 | 115 |
| 2 | 80 | 90 |
| 3 | 70 | 80 |
| Avg. (in · lbs) | 85 | 95 |
| Improvement to Control | 7.9 X | 13.6 X |

TABLE VI

Fasteners installed in boreholes including the adhesive composition of Example No. 3 (Inventive). The adhesive composition was allowed to cure for 72 hours at ambient temperature.
TAPCON® Screw - Tapered Head

| Anchored | Break | Prevail |
|---|---|---|
| 1 | 160 | 100 |
| 2 | 150 | 135 |
| 3 | 160 | 160 |
| Avg. (in · lbs) | 156.7 | 131.7 |
| Improvement to Control | 5 X | 5.2 X |

TABLE VII

Fasteners installed in boreholes including the adhesive composition of Example No. 4 (Inventive). The adhesive composition was allowed to cure for 72 hours at ambient temperature.
TAPCON® Screw - Tapered Head

| Anchored | Break | Prevail |
|---|---|---|
| 1 | 160 | 100 |
| 2 | 150 | 135 |
| 3 | 160 | 160 |
| Avg. (in · lbs) | 156.7 | 131.7 |
| Improvement to Control | 5.3 X | 7.1 X |

As illustrated above, one embodiment of the adhesive composition of the present disclosure provides a break away torque that is ~15 times greater than that of the control. The prevailing off torque is ~19 times greater than that of the control.

Further, as also illustrated above, the other embodiments of the adhesive composition of the present disclosure provide a break away torque that is at least 5 times greater than that of the control. The prevailing off torque is at least 5 times greater than that of the control.

The present invention provides a simple, yet useful means for anchoring fasteners, e.g. screws or bolts in concrete. The adhesive composition may be formed into a solid rod/stick by utilizing a UV-cured polymer in the polymeric matrix, where the UV-curable adhesive composition is cast in a tube form and irradiated so it stays intact. The resulting adhesive composition may be brittle enough to be snapped into a number of pieces which can easily be inserted into a borehole. A fastener can then be driven into the hole, mixing the adhesive material together, expanding, and anchoring the fastener in place.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A stick comprising an adhesive composition, wherein the adhesive composition comprises the reaction product of an ultraviolet-curable adhesive composition comprising:
    A) an epoxy curing agent component;
    B) a microencapsulated epoxy resin component;
    C) an expansion agent component;
    D) a binder component; and
    E) a photoinitiator component;

wherein the microencapsulated epoxy resin component B) and the expansion agent component C) are present in a weight ratio of from about 15:1 to about 1:1.

2. The stick according to claim 1, wherein the microencapsulated epoxy resin component B) and the expansion agent component C) are present in a weight ratio of from about 5:1 to about 3:1.

3. The stick according to claim 1, wherein the epoxy curing agent component A):
    i) comprises an amine;
    ii) is present in the ultraviolet-curable adhesive composition in an amount of from about 1 to about 20 part(s) by weight based on 100 parts by weight of the ultraviolet-curable adhesive composition; or iii) both i) and ii).

4. The stick according to claim 1, wherein the microencapsulated epoxy resin component B):
    i) comprises a novolac epoxy resin, a bisphenol F epoxy resin, or a combination thereof;
    ii) is present in the ultraviolet-curable adhesive composition in an amount of from about 25 to about 55 parts by weight based on 100 parts by weight of the ultraviolet-curable adhesive composition; or iii) both i) and ii).

5. The stick according to claim 1, wherein the expansion agent component C):
    i) comprises a microencapsulated expansion agent;
    ii) is present in the ultraviolet-curable adhesive composition in an amount of from about 1 to about 30 part(s) by weight based on 100 parts by weight of the ultraviolet-curable adhesive composition; or iii) both i) and ii).

6. The stick according to claim 1, wherein the binder component D):
    i) comprises a methacrylate-containing olefinically unsaturated monomer, an acrylate-containing olefinically unsaturated monomer, an acrylic resin, or combinations thereof;
    ii) is present in the ultraviolet-curable adhesive composition in an amount of from about 20 to about 50 parts by weight based on 100 parts by weight of the ultraviolet-curable adhesive composition; or iii) both i) and ii).

7. The stick according to claim 6, wherein the binder component D) comprises the methacrylate-containing olefinically unsaturated monomer and the acrylate-containing olefinically unsaturated monomer, and optionally wherein the methacrylate-containing olefinically unsaturated monomer and the acrylate-containing olefinically unsaturated monomer are present in a weight ratio of from about 10:1 to about 1:10, optionally of from about 2:1 to about 1:2.

8. The stick according to claim 1, wherein the photoinitiator component E) is present in the ultraviolet-curable adhesive composition in an amount of from about 0.1 to about 10 parts by weight based on 100 parts by weight of the ultraviolet-curable adhesive composition.

9. The stick according to claim 1, wherein the ultraviolet-curable adhesive composition further comprises an anti-settling component, a colorant component, or a combination thereof.

10. A method of forming the stick according to claim 1, the method comprising:
    providing the ultraviolet-curable adhesive composition; and
    irradiating the ultraviolet-curable adhesive composition to form the adhesive composition.

11. The method according to claim 10, wherein the step of providing the ultraviolet-curable adhesive composition comprises:

providing the ultraviolet-curable adhesive composition to a nozzle; and expelling the ultraviolet-curable adhesive composition through the nozzle to a release liner.

12. The method according to claim 10, wherein the stick has a semi-circular and/or semi-elliptical cross-section.

13. The method according to claim 10, wherein the method comprises partitioning the stick to form a plurality of portions of the stick.

14. The method according to claim 10, wherein the ultraviolet-curable adhesive composition is irradiated utilizing a source configured to generate ultraviolet light.

15. The method according to claim 14, wherein the step of irradiating the ultraviolet-curable adhesive composition comprises:

locating the source and the ultraviolet-curable adhesive composition proximate to each other; and energizing the source to generate ultraviolet light to irradiate the ultraviolet-curable adhesive composition.

16. The stick according to claim 1, formed by at least partially curing the ultraviolet-curable adhesive composition.

17. The stick according to claim 1, wherein the stick has:

a length of from 1 to 500 mm;

a diameter of from 0.1 to 10 mm; and/or a cross-section having a circular configuration, a semi-circular configuration, an elliptical configuration, a square configuration, a rectangular configuration, or a triangular configuration . . .

18. A method for joining a fastener and an element defining a borehole, the method comprising the steps of:

providing the fastener;

providing the stick as set forth in claim 1;

disposing the stick into the borehole; and disposing the fastener into the borehole;

wherein the stick is disposed at least partially between the fastener and the borehole to form a joint; and wherein the stick expands and cures in the joint to fasten the fastener in the borehole.

19. The method according to claim 18, wherein:

i) the fastener is an anchor or screw;

ii) the element comprises at least one of cement, concrete, or mortar; or iii) both i) and ii).

* * * * *